United States Patent [19]

Ferrara et al.

[11] Patent Number: 5,063,079
[45] Date of Patent: Nov. 5, 1991

[54] METHOD OF PRODUCING SHELF STABLE WHEAT GERM

[76] Inventors: Peter J. Ferrara, Ridge Rd., P.O. Box 441, Cornwall, N.Y. 12518; John T. Benson, 1260 N. 200 East, #18, Logan, Utah 84321

[21] Appl. No.: 446,806

[22] Filed: Dec. 6, 1989

[51] Int. Cl.$^5$ ............................................. A21D 2/38
[52] U.S. Cl. ................................... 426/627; 426/455; 426/506; 426/507; 426/622
[58] Field of Search ............... 426/627, 455, 506, 507, 426/615, 618, 622, 443

[56] References Cited

U.S. PATENT DOCUMENTS

| | | | |
|---|---|---|---|
| 3,396,033 | 8/1968 | Ferrara et al. | 426/622 |
| 3,519,441 | 7/1970 | Ferrara et al. | 426/455 |
| 3,783,164 | 1/1974 | Galle | 426/627 |
| 3,895,121 | 7/1975 | Huessy | 426/622 |

*Primary Examiner*—Donald E. Czaja
*Assistant Examiner*—D. Workman
*Attorney, Agent, or Firm*—Michael G. Gilman

[57] ABSTRACT

An improved wheat germ having longer shelf life by reason of its having been steamed under conditions sufficient to remove sulfhydril therefrom including venting about 0.2 to 0.4 pounds of steam condensate per pound of treated wheat germ during the steaming operation.

4 Claims, No Drawings

METHOD OF PRODUCING SHELF STABLE WHEAT GERM

This invention relates to stable cereal and oil seed products and more particularly to a method of processing such to have a pleasing flavor, high nutritive value, and exceptional stability. In the particular case of the cereal seed being wheat germ, it is useful as a breakfast cereal. It a also quite a useful ingredient in baked goods, whether or not these are leavened with active yeast or other agents approved for such use.

BACKGROUND OF THE INVENTION

The milling processes from which the wheat germ fraction is recovered are well established and familiar to the wheat milling industry. Generally, the isolated wheat germ constitutes about 2 percent of the weight of the processed wheat. This fraction, also known as the embryo of the wheat, will assay about 9.5 percent wheat germ oil, and about 27–29 percent protein (N×6.25). The wheat germ oil is a source of Vitamin E.

When freshly toasted, wheat germ has a pleasing nutty flavor. This nice flavor coupled with the nutritive aspects associated with wheat germ, make it an attractive health food. Despite the recognized features of nutrition and flavor, wheat germ has one negative which is also well known. It may become rancid in a short time if it is left unrefrigerated. Sometimes this rancidity, or off-flavor, occurs in as short a time as three or four days. This poor shelf-life has been observed even with wheat germ packaged in sealed glass jars, with a nitrogen purge to eliminate air, and evacuated after filling. The product labels often advise refrigeration of the jars containing wheat germ after they are unsealed. Even if refrigerated, its shelf life is less than desirable and needs to be improved.

One of the objectives of this invention is to process wheat germ, or other cereal seeds, so as to improve its shelf-life, or stability at ambient temperatures, to as much as at least seven to eight months or even more.

Another objective of this invention is to achieve this outstanding degree of stability without the use of chemical additives.

Another object of this invention is concerned with packaging the processed wheat germ.

Another object of this invention is to process wheat germ to eliminate sulphydryl (SH) to an extent sufficient that it may be a useful ingredient in bakery products without adversely affecting the flour glutens.

The techniques for achieving these objectives, and others, will become apparent from the following description of this invention, which will be detailed with reference to and exemplified by a process for the improvement of wheat germ and by the wheat germ product produced thereby. It should be recognized that, although wheat germ will have been used to illustrate the practice of this invention, it is by no means a limitation upon the utility and applicability of the invention hereof.

In U.S. Pat. No. 3,519,441, "Process for Treating Flour and Starch to Eliminate Free SH Groups," issued to Ferrara et al., the art taught therein shows that the elimination of sulfhydryl groups (SH) in wheat germ achieves a prolongation of shelf-life. This patent showed that steaming wheat germ for 35 to 50 minutes was adequate, in most cases, to produce a product which had improved shelf life in that rancidity was avoided for longer than had been possible in the past. It was found that longer intervals of steaming resulted in the loss of the nutty flavor usually associated with freshly toasted wheat germ. (See Column 8, Lines 70–75). In this patent, the tests which had been run allowed little steam to escape. In column 9, lines 4–10 it is stated: "There appears to be a slight but noticeable difference in the SH and the enzyme activity...between wheat germ meals made from different wheats, etc.".

In the processes of U.S. Pat. No. 3,519,441, to insure the pressure in the cooker was maintained at a constant pressure, a small amount of steam was allowed to escape. Since allowing steam to escape was for control purposes, the amount of steam which was allowed to escape was kept to a minimum. The steam which did escape from the toaster smelled like cooked wheat germ. No attempt was made to determine the amount of escaping steam since it was not considered to be a substantial variable in the process. It was believed that the shelf life of the product wheat germ was a function only of the amount of SH elimination and not the way in which the SH elimination was accomplished.

SUMMARY OF THE INVENTION

In the course of new research on Cooking wheat germ with steam at different pressures, it has now been found that, in the elimination of SH content of wheat germ, the amount of escaping steam, the steam pressure and the duration of steaming are significant variables in this process and that control thereof, as set forth hereinafter, produces a wheat germ which not only has remarkably improved shelf life, but also has excellent taste and appearance.

Consideration of the data recently obtained suggests that the source of rancidity of wheat germ may reside in the wheat germ oil. This oil has been reported to contain mixed tocopherols equivalent to several international units of Vitamin E per gram. Of the seven tocopherols which have been identified, the delta form is a potent anti-oxidant, possibly 100 times more powerful than the other forms. This may be a plus in terms of wheat germ stability. On the other hand, literature references, such as Bailey's Industrial Oil and Fat Products. . ." (Interscience Publishers), report that wheat germ oil assays up to 30 percent oleic acid. This fatty acid is said to be easily oxidized at atmospheric pressure at temperatures as low as 80°–100° C. One of the distinctive attributes of oleic acid is that, on oxidation, it gives off a rancid odor. Although the oxidation of oleic acid may be linked to rancidity, this does not explain the effect that eliminating SH has on shelf-life. A search for clues is what led to the present invention.

DETAILED DESCRIPTION OF THE INVENTION

The invention described herein is based on the discovery that in steaming wheat germ under pressure for the elimination of SH, controlling the amount of escaping steam from the vessel or chamber containing the wheat germ significantly improves the shelf life of the product. The control of the escaping steam is important to controlling SH elimination, as well as substantially increasing shelf life of the wheat germ after steaming.

Prior to the discovery cited herein, the data on steaming wheat germ were derived from three processes. The first was the implementation of steaming according to the manner described in Example III in U.S. Pat. No. 3,519,441. The results reported in this Example were based on only a negligible amount of escaping steam, no more than the minimum necessary to maintain a substantially constant pressure in the steaming vessel. The amount of steam condensed to moisten the wheat germ was determined, as the moisture pick up of the wheat germ, to be about 0.10 pound of water per pound of germ.

Two other examples of steam processing of wheat germ, without escaping steam, were laboratory experiments using "Bokfard Cookers", processing units manufactured and sold by StorkAmsterdam, a company located in Amsterdam, the Netherlands. In one series of Bokfard tests, wheat germ was placed in a horizontal stainless cylindrical drum within an enclosed stationary chamber. The drum can be rotated at different speeds. It is closed at the end engaging the drive mechanism, and the other end is open to a chamber full of steam. The inside of the drum is equipped with vanes or flights. Wheat germ was charged into the drum and as the drum rotated, the vanes or flights carried the wheat germ around causing it to fall or cascade through a curtain of steam vapors to the bottom of the drum. The germ was again picked up and carried through another cycle to near the top of the drum and again caused to cascade through the steam. Data were collected in a series of tests in which steam pressure, temperature, and time intervals of contact between the germ and steam were varied, respectively. Samples of germ were analyzed for residual SH.

Another series of Bokfard tests was conducted in a unit somewhat like the rotating chamber unit of the first test, except, in this unit, there was a central shaft with attached paddles. The paddles in effect churned or agitated the wheat germ exposing it to a layer of steam which was maintained over the germ.

In checking comparable samples of processed wheat germ for residual sulfhydryl content, it was apparent that the wheat germ from the rotary test(the first test set forth above) was much better than the wheat germ processed with the paddles. Typical comparisons of the two Bokfard tests are as follows: (1) with the rotary drum unit, germ treated with steam at 14.3 PSIG, and a temperature of 120° C. for a 16 minute interval, resulted in a product where the residual SH was a trace; and (2) in the unit where the wheat germ was agitated with paddles, under the same process conditions as (1), also for 16 minutes, wheat germ was produced with a large amount of residual SH. This was the first clue or indication that better exposure of the individual wheat germ particles to an atmosphere of steam produced better results. This finding suggested that wheat germ has some labile component which may be purged or removed by direct exposure to steam, and the wheat germ purged of this component produces more favorable results, measured by lower residual SH.

Another piece of evidence drawn from the Bokfard tests is reflected in the rate at which SH is eliminated when the wheat germ is "in motion", that is dropped through the steam layer, as compared to the results obtained in the test using a stationary bed as in Example III in U.S. Pat. No. 3,519,441. The reduction in SH was 30–40 percent quicker in the "in motion" tests as in Bokfard test No. 1.

To confirm that some labile component is freed when wheat germ is steamed under pressure, various cooker designs were considered. One piece of equipment common to many food company laboratories is a sterilizer. The one selected for these investigations consisted of a horizontal stainless cylinder, 20 inches in diameter, with a depth of 32 inches. Steam is admitted to the chamber at the back of the unit, and exits from the chamber through an outlet connection just inside the hinged door at the front of the unit. The chamber is enclosed in a jacket which may be steam heated to apply dry heat to the chamber contents. This sterilizer unit is designed for chamber and jacket steam pressure up to 22 PSIG. Five stainless steel trays 32 inches long, 1½ inches deep, and widths varying from 15 to 17 inches were designed so all five could be installed one on top of the other inside the chamber. A space of ½ inches separates each tray from the one below it. Each tray was filled with 4.4 lbs. of wheat germ, about 1 inch in depth. Steam admitted to the sterilizing chamber was directed to the back of an 18 inch diameter disc which served to distribute the entering steam.

Steam pressure to the sterilizing chamber is maintained by an adjustable pressure controller. Steam escaping from the chamber outlet is controlled by a V-port value or by orifices installed in the exit piping. The escaping steam passes to a condenser coil immersed in an ice bath and collected for subsequent analyses. From previous experience with steaming wheat germ, confirmed in the Bokfard tests, the steam germ moisture increases from the commercial level of 10–12 percent to about 18 percent. Thus, the moisture pickup is about 0.10 lbs. of water per pound of wheat germ. For the 22 lbs. of germ charged to the 5 trays, this means an increase of about 2.2 lbs. due to moisture pick up.

To begin the investigation of how much escaping steam from the sterilizer was needed, the target was set at 4.4 lbs. of condensate during an interval of 35 minutes. This was equivalent to 0.20 lb. of condensate per lb. of germ, approximately twice the amount of condensate picked up by the germ. The amount of escaping steam is approximately 1.90 ft/minute in the free space of the 20 inch chamber. To control this rate of condensate production, a 1/32 inch orifice was installed in a ½ inch standard steel pipe. The results were very interesting.

At the escaping steam rate of approximately 4.4 lbs. in a 35 minute interval of steaming the 22 lbs. of wheat germ, the residual SH continued as nil while the chamber pressure was reduced in successive tests of 14 PSIG - 12 PSIG - 10 PSIG - 8 PSIG. When the chamber pressure was reduced to 6 PSIG, traces of residual SH began to appear.

Having established the degree of variability of the steam pressure, the next investigation was concerned with the time intervals at 10 PSIG and 8 PSIG. These lower pressures are preferred over the higher pressures of the prior art, because the higher pressures cause the wheat germ to lose its bright color tones and cause an adverse change in the taste of the germ. At these pressures, the time interval was reduced in stages from 35 minutes to 20 minutes, at which point residual SH began to appear.

The amount of escaping steam was varied between 0.20 lb. of condensate per lb. of wheat germ up to 0.40 lb. per lb. without changing the wheat germ as to color or shelf life. Increasing the escaping steam rate beyond 0.40 lb. per lb. of germ, caused the germ to become darker. This was probably due to the steam being hotter since it was originally obtained from a steam supply of 70 PSIG. When the quantity of escaping steam was reduced to about 0.10 lb. of steam per lb. of treated wheat germ, trace amounts of SH started to appear. The extra heat was not a factor except at elevated steam supply flow rates.

It became apparent in the course of steaming the wheat germ that controlling the amount of "escaping steam," greatly facilitated the process of SH elimination. Of greater importance was the stability or shelf-life of the wheat germ product. The freshly steamed wheat germ was able to retain its pleasing nutty flavor for eight months and longer, thus meeting the parameters of shelf-life for some ready to eat cereals.

Having established that steaming wheat germ, so that an escaping stream of vapors does in fact remove some component which lowers residual SH, samples of the condensed steam were examined. The condensate pH was 7.2-7.4. A test for ammonia gave a very slight reading. A colloidal suspension in the condensate tested positive for sulfur. Some of the particles of sulfur were so fine as to produce a filmy layer on the surface of the condensate. This filmy layer checked under a microscope showed no cystallinity; the sulfur was amorphous. On the basis of these tests on the condensate, it appears that the escaping steam may carry out the unstable ammonium polysulfides, probably the penta form $(NH_4)_2S_5$, which is known to decompose at about 120° C. There was no evidence that any oil fractions accompanied the escaping steam.

From the data reported on the elimination of SH, possibly from the breaking down of the tri-peptide, glutathione, it would appear that the removal of its SH probably is accompanied by a labile or fugitive ammonium polysulfide. These two actions together may account for the unexpected degree of shelf-life of wheat germ steam treated according to this invention provided some controlled amount of steam is allowed to escape.

The success of the process of this invention is predicated on the substantial removal of sulfhydryl (SH) from wheat germ in a manner which maintains the flavor of the germ and substantially increases the shelf life thereof. The test which was used to determine the presence or absence of sulfhydryl was carried out as follows:

Place four (4) grams of wheat germ in a container, such as a test tube; add six (6) ml. of a saturated aqueous solution of zinc acetate to the container and agitate until substantially all of the wheat germ is wetted with the zinc acetate solution; add six (6) ml. of water; stir and then let stand for two (2) to four (4) minutes: add five (5) drops of ten (10) % solution of sodium nitro prusside in water and let stand for up to five (5) minutes. Within that five (5) minutes, the color of the test solution will stabilize and can be compared to known color charts for this analysis. The deeper the red color, the greater the proportion of SH. If no red color appears, the wheat germ tested was substantially free of sulfhydryl (SH).

This invention shows how to produce a shelf stable wheat germ by the application of the process described herein but is not limited to the product or the process methods of the examples cited herein.

What is claimed is:

1. A method of extending the shelf life of wheat germ, by the elimination of free SH groups, without adversely affecting the flavor of the wheat germ, which comprises: contacting the wheat germ with steam in a chamber, under a combination of conditions sufficient to reduce the sulfhydryl(SH) content of the wheat germ to substantially nil, including maintaining pressures of about 8 to 14 PSIG in said chamber for about 20 to 35 minutes, while drawing off from said chamber about 0.20 lb. to 0.40 lb. of steam per lb. of wheat germ being steamed.

2. Method according to claim 1 wherein the steam pressure is 8-10 PSIG.

3. Method according to claim 1 wherein the wheat germ is steamed for 25-35 minutes.

4. The method of claim 1 including drawing off steam at a controlled rate sufficient to hasten the disappearance of residual SH simultaneous with the steaming.

* * * * *